(12) United States Patent
Tasaka

(10) Patent No.: US 7,328,041 B2
(45) Date of Patent: Feb. 5, 2008

(54) HIGH-FREQUENCY SWITCH MODULE

(75) Inventor: Naoyuki Tasaka, Yokohama (JP)

(73) Assignee: Fujitsu Media Devices Limited, Yokohama (JP)

( * ) Notice: Subject to any disclaimer, the term of this patent is extended or adjusted under 35 U.S.C. 154(b) by 489 days.

(21) Appl. No.: 10/963,814

(22) Filed: Oct. 14, 2004

(65) Prior Publication Data
US 2005/0079828 A1  Apr. 14, 2005

(30) Foreign Application Priority Data
Oct. 14, 2003  (JP) .............................. 2003-354151

(51) Int. Cl.
H04M 1/00 (2006.01)
H04B 1/46 (2006.01)

(52) U.S. Cl. ............................... 455/552.1; 455/550.1; 455/82

(58) Field of Classification Search ................ 455/334, 455/552.1, 550.1, 82, 83, 73, 227, 77, 432.1; 333/101, 132, 185
See application file for complete search history.

(56) References Cited

U.S. PATENT DOCUMENTS

| 6,870,442 | B1 * | 3/2005 | Suzuki et al. ............... 333/133 |
| 6,975,841 | B2 * | 12/2005 | Uriu et al. .................... 455/78 |
| 6,985,712 | B2 * | 1/2006 | Yamakawa et al. ......... 455/333 |
| 6,995,630 | B2 * | 2/2006 | Satoh et al. ................. 333/133 |
| 7,057,472 | B2 * | 6/2006 | Fukamachi et al. ......... 333/101 |
| 7,076,216 | B2 * | 7/2006 | Hayashi ....................... 455/78 |
| 7,142,832 | B2 * | 11/2006 | Inoue et al. ................. 455/129 |
| 2002/0032038 | A1 | 3/2002 | Furutani et al. |
| 2002/0090974 | A1 | 7/2002 | Hagn |
| 2003/0068998 | A1 * | 4/2003 | Yamakawa et al. ......... 455/339 |
| 2005/0059358 | A1 | 3/2005 | Block et al. |

FOREIGN PATENT DOCUMENTS

| CN | 1336731 A | 2/2002 |
| DE | 100 53 205 A1 | 5/2002 |
| DE | 102 01 433 A1 | 7/2003 |
| JP | 2002-64301 | 2/2002 |
| JP | 2002-101005 | 4/2002 |
| JP | 2003-18039 | 1/2003 |
| WO | 03/030383 A1 | 4/2003 |

OTHER PUBLICATIONS

H. H. Meinke, "Einführung in Die Elektrotechnik Höherer Frequenzen", Bauelemente und Stromkreise, Springer publishing company, Berlin/Heidelberg/New York, 1965, pp. 132-136, vol. 1.

* cited by examiner

Primary Examiner—Sonny Trinh
(74) Attorney, Agent, or Firm—Arent Fox LLP

(57) ABSTRACT

A high-frequency switch module is less power consumable, and is able to be small-sized and thinner in thickness. The high-frequency switch module is also able to obtain an amount of attenuation in a stopband and proper characteristics. The high-frequency switch module includes a gallium arsenide (GaAs) switch made of gallium arsenide that is less power consumable and low pass filters for respective transmission systems. A low pass filter is composed of a first inductor and a capacitor connected in series, and second and third inductors respectively connected to input and output terminals, and the second and third inductors having inductances greater than that of the first inductor.

13 Claims, 10 Drawing Sheets

PRIOR ART

HIGH-FREQUENCY SWITCH MODULE 10

LOW PASS FILTERS 4a, 4b

LOW PASS FILTER 904a, 904b

IMPEDANCE CHARACTERISTIC OF LOW PASS FILTERS 4a, 4b

IMPEDANCE CHARACTERISTIC OF LOW PASS FILTERS 904a, 904b

IMPEDANCE REGULATOR CIRCUITS 25a, 25b, 25c

L (INDUCTOR TRIMMING)

C (CAPACITOR TRIMMING)

HIGH-FREQUENCY SWITCH MODULE 40

IMPEDANCE REGULATOR CIRCUITS 25a, 25b, 25c

HIGH-FREQUENCY SWITCH MODULE

BACKGROUND OF THE INVENTION

1. Field of the Invention

This invention generally relates to a high-frequency switch module, and more particularly, to a high-frequency switch module used for a front end module of multiple communication systems.

2. Description of the Related Art

In recent years, mobile telephones, for example, have been upgraded in functions and services. As part of the example, mobile telephones that can utilize multiple communication systems have been proposed.

Communication devices as represented by the above-mentioned mobile telephones are required to establish communication at different frequency ranges. Recently developed triple-band mobile telephones are able to communicate with three transmission and reception systems such as GSM (Global System for Mobile Communications) system, DCS (Digital Communications System) system, and PCS (Personal Communications Service) system.

However, the above-mentioned GSM, DCS, and PCS systems utilize different frequency ranges; therefore the mobile telephone is equipped with a switch for switching the frequency ranges to utilize these systems.

A high-frequency switch module having a separator and a PIN diode switch circuit for switching the frequency ranges has been proposed, as disclosed in Japanese Patent Application Publication No. 2002-101005 and Japanese Patent Application Publication No. 2002-64301. FIG. 1 shows a high-frequency switch module 900, which is an example of the above-mentioned high-frequency switch module.

Referring to FIG. 1, the high-frequency switch module 900 includes a separator/combiner 901 connected to an antenna 909, two PIN diode switch circuits 902 and 903 connected to the separator/combiner 901, a low-pass filter (hereinafter simply referred to as LPF) 904a and a band-pass filter (hereinafter simply referred to as BPF) 905a connected to the PIN diode switch circuit 902, a LPF 904b, a BPF 905b, and a BPF 905c, which filters are connected to the PIN diode switch circuit 903.

The separator/combiner 901 separates high-frequency signals inputted from the antenna 909, and then applies each of the separate signals to the PIN diode switch circuit 902 or 903. At the same time, the separator/combiner combines the high-frequency signals from the PIN diode switch circuits 902 and 903, and applies the combined signals to the antenna 909. The PIN diode switch circuit 902 selects one of the LPF 904a and the BPF 905a in order to selectively use two frequency ranges. The PIN diode switch circuit 903 selects one of the LPF 904b, the BPF 905b, and the BPF 905c in order to selectively use three frequency ranges. With the above structure, the high-frequency switch module 900 can handle the three transmission and reception systems.

However, the above-mentioned high-frequency switch module requires the separator/combiner in order to selectively use the three transmission and reception systems. Therefore, the module needs a large number of components and has a difficulty in downsizing.

Besides, generally, the high-frequency switch module equipped with the separator/combiner and the PIN diode switch circuit is required to cause a sufficient amount of current to flow in the PIN diode switch circuit in order to realize a low insertion loss. However, this circuitry consumes a large amount of power. This causes a serious problem, particularly, for battery-driven electronic devices such as mobile telephones because the battery is exhausted faster.

There is a proposal to solve the above-mentioned problem, as disclosed in Japanese Patent Application Publication No. 2003-18039. The proposal employs a gallium arsenide (GaAs) switch, which is less power consumable than the PIN diode switch circuit.

However, the GaAs switch has a small amount of stopband attenuation. The high-frequency switch module equipped with the GaAs switch has a problem in that a transmission and reception system in a selected state might be affected by another transmission or reception system.

SUMMARY OF THE INVENTION

The present invention has been made in view of the above circumstances and provides a high-frequency switch module that has small power consumption and is capable of being downsized. In addition, the high-frequency switch module retains the stopband attenuation and obtains proper characteristics.

According to an aspect of the present invention, a high-frequency switch module including transmission systems respectively equipped with low pass filters, and a GaAs switch that selects one of the low pass filters, and a low pass filter is composed of a first inductor and a capacitor connected in series, and second and third inductors respectively connected to input and output terminals, and the second and third inductors having inductances greater than that of the first inductor.

BRIEF DESCRIPTION OF THE DRAWINGS

Preferred embodiments of the present invention will be described in detail based on the following figures, wherein.

DESCRIPTION OF THE PREFERRED EMBODIMENTS

The following is a description of embodiments of the present invention, with reference to the accompanying drawings.

A description will first be given of a first embodiment. The present embodiment employs a switch made of gallium arsenide (GaAs), which consumes relatively small power (hereinafter referred to as GaAs switch). The GaAs switch is able to reduce current consumption considerably, as compared to a PIN diode switch. The GaAs switch is also able to downsize and reduce the thickness of an overall high-frequency switch module, since it is no longer necessary to incorporate a special circuit in order to reduce the power consumption. In accordance with the present embodiment, a transmission system is equipped with a low pass filter (hereinafter simply referred to as LPF), and inductance is applied to input and output terminals of the LPF. Here, the high-frequency switch module is configured so that the inductances applied to input and output terminals are higher than that applied between the input and output terminals. Accordingly, the input impedance becomes almost infinite in a stopband of the LPF. Thus, it is possible to retain a sufficient amount of stopband attenuation and achieve proper product characteristics.

Figure 2:
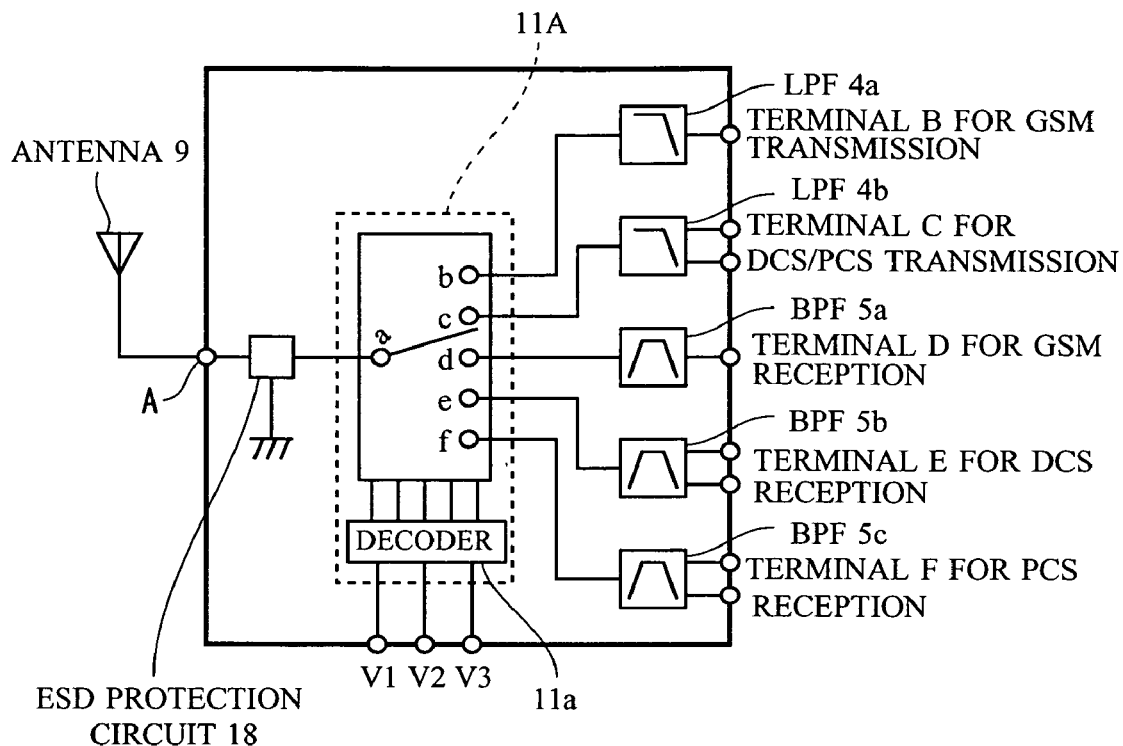
FIG. 2 shows a high-frequency switch module 10 in accordance with a first embodiment of the present invention.

A description will be now given of the high-frequency switch module, with reference to the accompanying drawings. FIG. 2 shows a high-frequency switch module 10 in accordance with the present embodiment. Referring to FIG. 2, the high-frequency switch module 10 includes a GaAs switch 11A, a LPF 4a for a GSM transmission system, a LPF 4b for a DCS/PCS transmission system LPF, a BPF 5a for a GSM reception system, a BPF 5b for a DCS reception system, and a BPF 5c for a PCS reception system.

The GaAs switch 11A has a one-to-n configuration where n is a natural number more than 1. In FIG. 2, the GaAs switch 11A serves as a 1-to-5 switch that has terminals a through f. The GaAs switch 11A makes a connection between the terminal a and any one of the terminal b through f based on a switching signal from outside. A decoder 11a is incorporated into the GaAs switch 11A to decode the switching signal from outside. The decoder 11a includes three control terminals V1, V2, and V3. Three bits of the switching signal are respectively applied to the control terminals V1, V2, and V3. The decoder 11a converts the switching signal thus applied into a control voltage in order to selectively use one of the terminals b through f, to which the terminal a is connected. That is, the decoder 11a selectively uses one of the terminals b through f to which the terminal a is connected, based on a voltage level (High/Low) of each bit in the switching signal applied to the three control terminals V1, V2, and V3.

Figure 3:
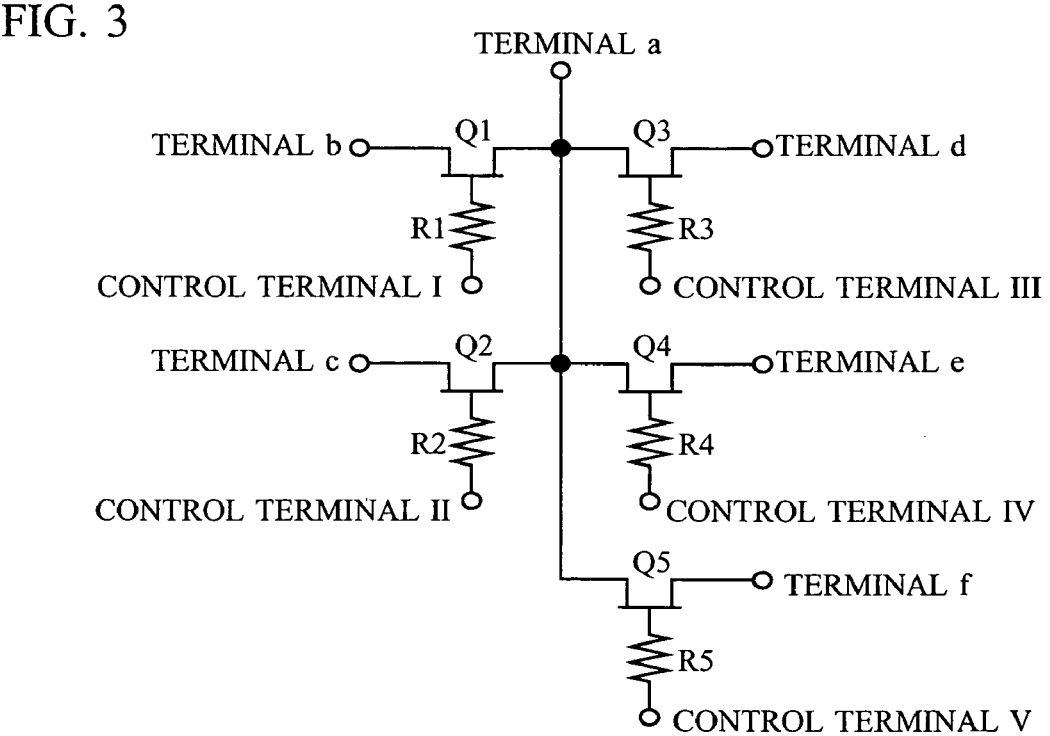
FIG. 3 shows a circuitry of a GaAs switch 11A in accordance with the first embodiment of the present invention.

FIG. 3 shows a circuitry of the GaAs switch 11A in accordance with the present embodiment. A circuitry of the decoder 11a is omitted in FIG. 3 to simplify the explanation. The GaAs switch 11A includes five field effect transistors (hereinafter simply referred to as FET) Q1 through Q5, and also includes five resistors R1 through R5 respectively connected to the gates of the FETs Q1 through Q5. Either the source electrodes of the FETs Q1-Q5 or the drain electrodes thereof are coupled together and are connected to the terminal a. Each of the other electrodes of FETs Q1-Q5 is connected to the respective one of the terminals b through f so that the one-to-one connection can be made. Control terminals I, II, III, IV, and V are respectively connected to ends of the resistors R1 through R5 opposite to those which are respectively connected to the gate electrodes of the FETs Q1 through Q5. Voltages produced by decoding the switching voltage in the decoder 11a are applied to the control terminals I, II, III, IV, and V. Therefore, one of the FETs (Q1 through Q5) is turned ON in response to the decoded switching voltage, and the one-to-one connection is made between the terminal a and one of the terminals b through f. Table 1 shows the relationship between the voltage levels of V1, V2, and V3 in the decoder 11a and the voltage levels of the control terminals I through V, namely, an example of switching logic of transmission and reception.

TABLE 1

|  | V1 | V2 | V3 |
|---|---|---|---|
| GSM transmission (terminal b) | High | Low | High |
| DCS/PCS transmission (Terminal c) | Low | Low | High |
| GSM reception (terminal d) | High | Low | Low |
| DCS reception (terminal e) | Low | Low | Low |
| PCS reception (terminal f) | Low | High | Low |

Referring to Table 1, the terminal a can be selectively connected to one of the terminals b through f by turning ON and OFF the FETs Q1 through Q5. That is, the GaAs switch 11A is able to selectively use one of the LPFs 4a and 4b and BPFs 5a, 5b, and 5c.

Referring back to FIG. 2, an ESD (Electro-Static Discharge) protection circuit 18 is connected to the terminal a of the GaAs switch 11A in order to protect the GaAs switch 11A against static electricity. The ESD protection circuit 18 is also connected to an antenna 9 via an antenna terminal A.

The ESD protection circuit 18 includes, for example, a high-pass filter (HPF). The ESD protection circuit 18 prevents static electricity via the antenna 9 from being applied to the GaAs switch 11A.

Figure 4A:
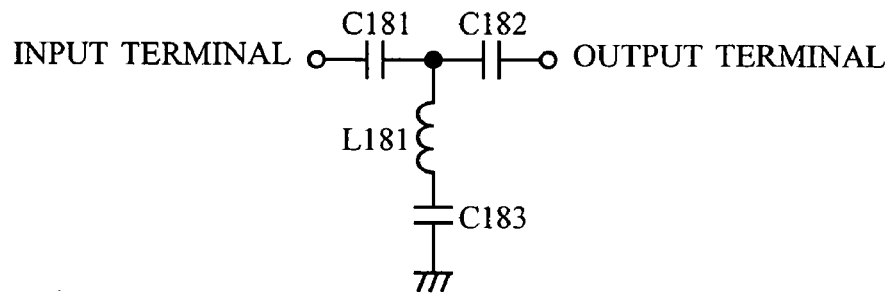
FIG. 4A shows a first example in the case where an ESD protection circuit 18 employs a T-type HPF.
Figure 4B:
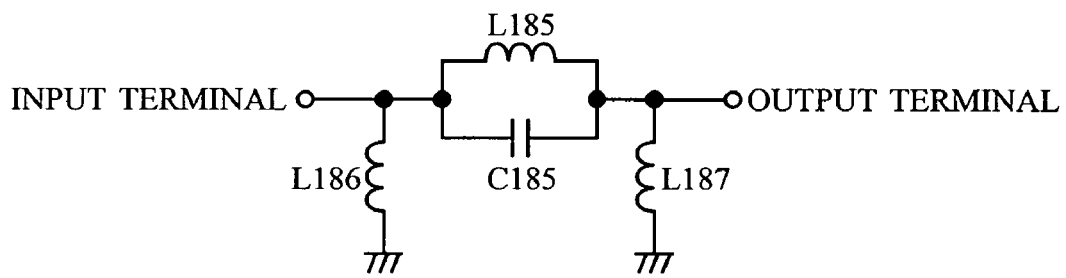
FIG. 4B shows a second example in the case where the ESD protection circuit 18 employs a π-type HPF.

Generally, the GaAs switch 11A is easily damaged by static electricity. It is thus possible to effectively protect the GaAs switch 11A by introducing the ESD protection circuit 18 between the GaAs switch 11A and the antenna 9. FIGS. 4A and 4B show examples of the ESD protection circuit 18 having the HPFS.

FIG. 4A shows a first example equipped with the ESD protection circuit 18 that employs a T-type HPF. As shown in FIG. 4A, the ESD protection circuit 18 includes an input terminal, an output terminal, and two capacitors C181 and C182 connected in series. A line that connects the capacitors C181 and C182 is branched and is grounded via an inductor L181 and a capacitor C183 connected in series.

FIG. 4B shows a second example in the case where the ESD protection circuit 18 employs a π-type HPF. As shown in FIG. 4B, the ESD protection circuit 18 includes an input terminal, an output terminal, and an inductor L185 connected in parallel with a capacitor C185. A line that connects the input terminal and the inductor L185 parallel to the capacitor C185 is branched and is grounded via an inductor L186. Similarly, the other line that connects the output terminal and the inductor L185 parallel with the capacitor C185 is branched and is grounded via an inductor L187.

The ESD protection circuit 18 includes the above-mentioned circuitry between the antenna 9 and the GaAs switch 11A, and is capable of preventing static electricity from flowing into the GaAs switch 11A via the antenna 9. This makes it possible to protect the GaAs switch 11A against static electricity.

Referring back to FIG. 2, the LPFs 4a and 4b, BPFs 5a, 5b, and 5c are respectively connected to the terminals b through f in the GaAs switch 11A so as to pass the respective frequency ranges in the respective communication systems. That is, the LPFs 4a and 4b in the two transmission systems, and the BPFs 5a, 5b, and 5c in the three reception systems are connected to the GaAs switch 11A. Specifically, the LPF 4a is connected between the terminal b and the terminal B for GSM transmission, the LPF 4b is connected between the terminal c and the terminal C for DCS/PCS transmission, the BPF 5a is connected between the terminal d and the terminal D for GSM reception, the BPF 5b is connected between the terminal e and the terminal E for DCS reception, and the BPF 5c is connected between the terminal f and the terminal F for PCS reception. A surface acoustic wave (SAW) filter may be used for the BPFs 5a, 5b, and 5c. The terminal B for GSM transmission, the terminal C for DCS/PCS transmission, the terminal D for GSM reception, and the terminal E for DCS reception are external terminals, to which circuits that conform to the respective systems are connected.

Figure 5:
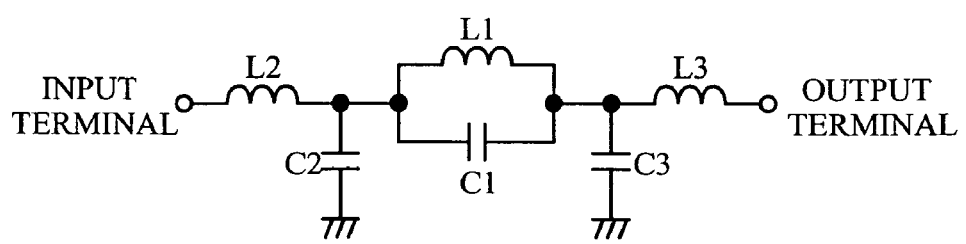
FIG. 5 shows a circuit structure of the LPFs 4a or 4b respectively connected to a terminal B for a GSM transmission system and a terminal C for a DCS/PCS transmission system in accordance with the first embodiment of the present invention.

FIG. 5 shows a circuit structure of the LPFs 4a or 4b. As described, the LPF 4a is connected to the terminal b and the terminal B for GSM transmission, and the LPF 4b is connected to the terminal c and the terminal C for DCS/PCS transmission. The LPFs 4a and 4b respectively include an inductor L1 and a capacitor C1 connected in parallel between the input terminal and the output terminal. A line that connects the inductor L2 and the inductor L1 parallel to the capacitor C1 is branched and is grounded via a capacitor C2. Another line that connects the inductor L3 and the inductor L1 parallel to the capacitor C1 is branched and is grounded via a capacitor C3. In the above-mentioned circuitry, the input terminal of the LPF 4a or 4b is connected to the inductor L2 connected in series with the capacitor C2. Similarly, the output terminal of the LPF 4a or 4b is connected to the inductor L3 connected in series with the capacitor C3.

By providing the inductors L2 and L3 to the input and output terminals of each of the LPFs 4a and 4b, it is possible to make the input impedance of the LPFs 4a and 4b almost infinite at frequencies outside of the pass range. This provides an increased amount of attenuation in the stopband. In the case mentioned above, the inductors L2 and L3 are so selected as to have inductances greater than that of the inductor L1. Accordingly, this selection makes the input impedance of the LPFs 4a and 4b infinite in the stopband. In the present description, the term "infinite" will be used when one value is large enough to ignore the other. The impedances of the respective LPFs 4a and 4b become infinite in frequency ranges of 2 GHz or over, which enables to obtain a sufficient amount of attenuation in the above-mentioned frequency ranges. The inductors L2 and L3 may respectively be replaced by capacitors. This replacement can also bring the same effects.

Figure 1:
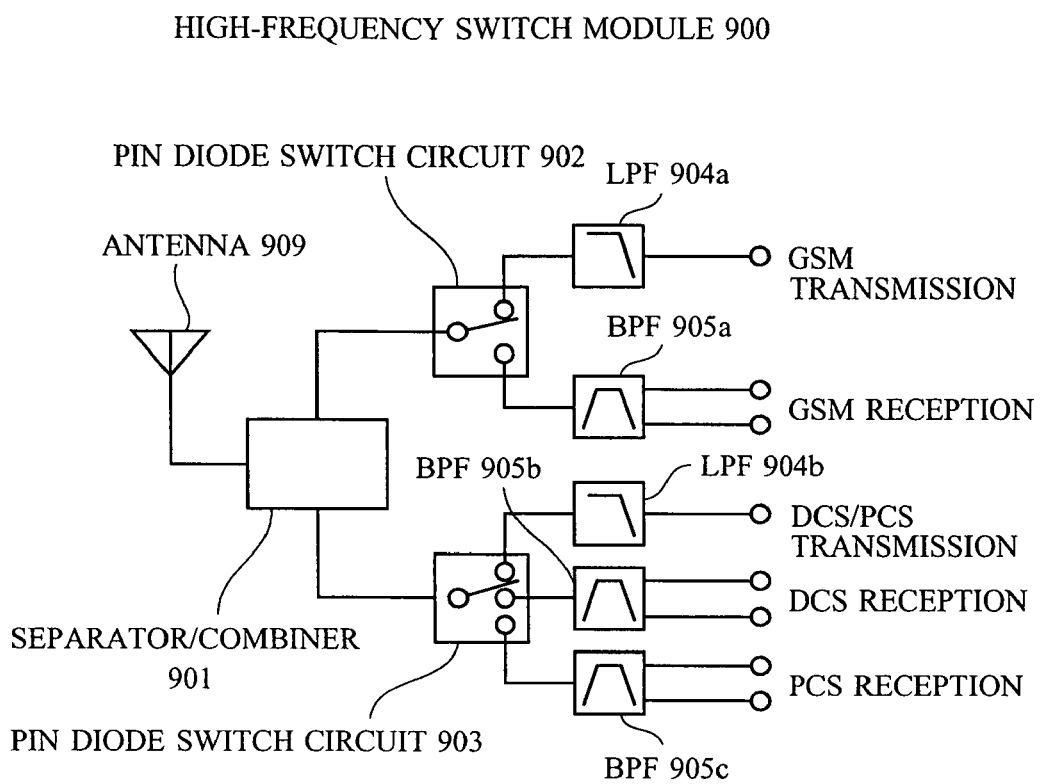
FIG. 1 shows a high-frequency switch module 900 in conventional technique.
Figure 6:
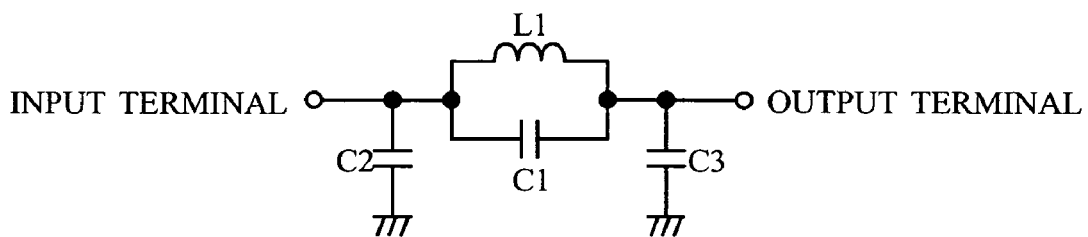
FIG. 6 shows an example of a circuit diagram of the conventional LPFs 904a and 904b (shown in FIG. 1), for comparison.
Figure 7:
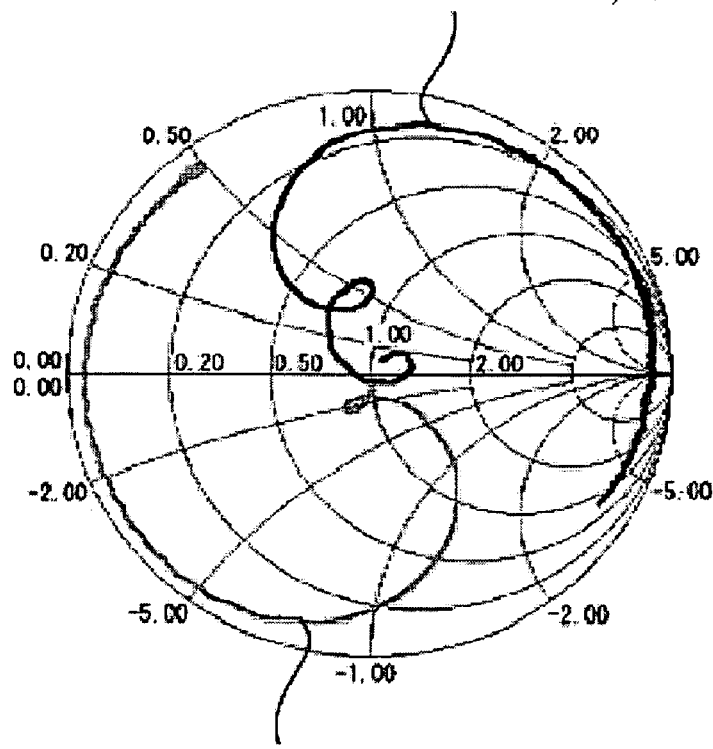
FIG. 7 shows a smith chart describing impedance characteristics of the LPFs 4a and 4b in accordance with the present embodiment of the present invention and those of the conventional LPFs 904a and 904b.
Figure 8:
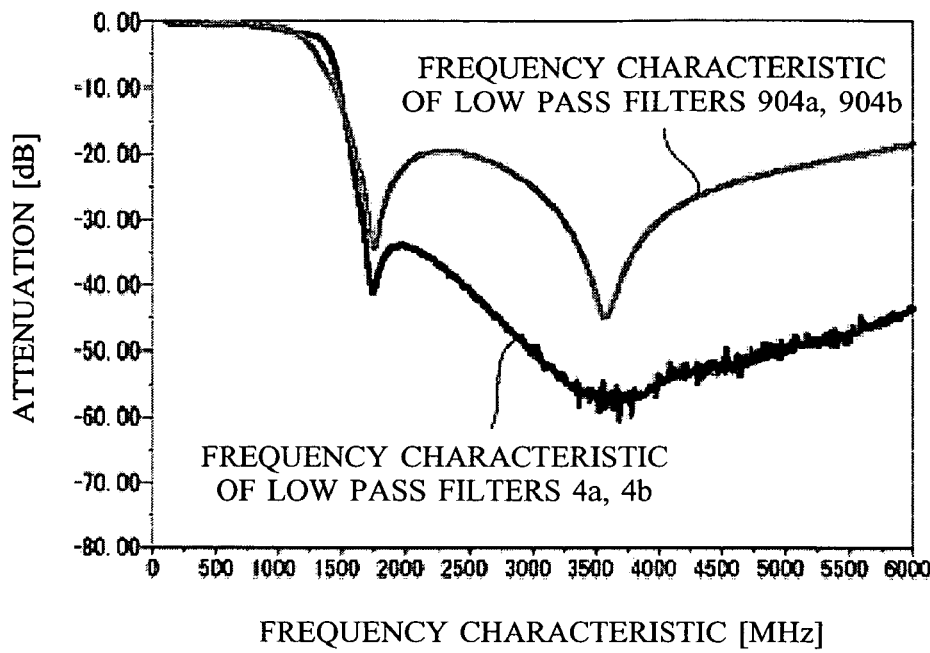
FIG. 8 shows filter characteristics of the LPFs 4a and 4b in the GSM transmission in accordance with the first embodiment of the present invention and those of the conventional LPFs 904a and 904b.

Here, FIG. 6 shows an example of a circuit diagram of the conventional LPFs 904a and 904b (shown in FIG. 1), for comparison. FIG. 7 shows a Smith chart describing impedance characteristics of the LPFs 4a and 4b in accordance with the present embodiment and those of the conventional LPFs 904a and 904b. FIG. 8 shows filter characteristics of the LPFs 4a and 4b in the GSM transmission as well as those of the conventional LPFs 904a and 904b.

Referring to FIG. 7, the conventional LPFs 904a and 904b do not include the inductors L2 and L3 respectively connected to the input and output terminals, in the case where the same circuit structure is employed as shown in FIG. 6. Referring to FIG. 7, regarding the impedance characteristics of the LPFs 4a and 4b, the phase is shifting to the infinite direction, compared with those of the LPFs 904a and 904b. That is, the Smith chart describes that, by introducing the inductors L2 and L3 connected to the input and output terminals, the phase is shifting so that the input impedances of the respective LPFs 4a and 4b become infinite in the stopband.

In addition, referring to FIG. 8, regarding the filter characteristics of the conventional LPFs 904a and 904b, the amount of attenuation cannot sufficiently be obtained, for example, in the frequency ranges of 2 GHz or over. In contrast, regarding the filter characteristics of the LPFs 4a and 4b in accordance with the present embodiment, the sufficient amount of attenuation is obtainable in the frequency ranges of 2 GHz or over. Therefore, the introduction of the LPFs 4a and 4b are able to improve product characteristics.

In the above-mentioned configuration, the inductors L2 and L3 may be made of chip parts, line pattern, and combination of the chip parts and line pattern.

Figure 9:
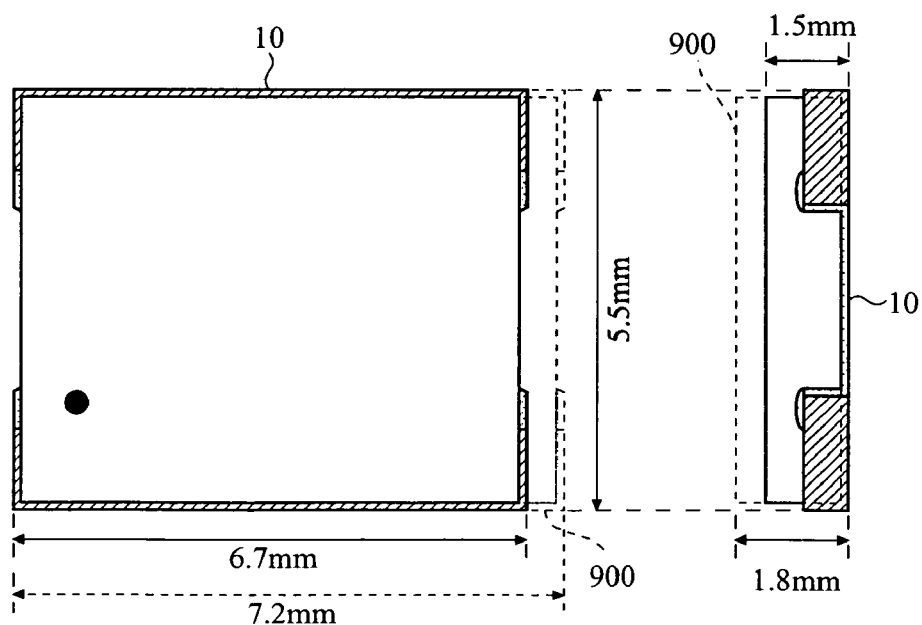
FIG. 9 shows a top view and a side view describing dimensions of the high-frequency switch module 10 in accordance with the first embodiment of the present invention.

The high-frequency switch module 10 does not require a circuit for reducing the power consumption, and can be downsized. Specifically, referring to FIG. 9, the high-frequency switch module has a size of, for example, 7.2 mm×5.5 mm=39.6 mm², when manufactured with the conventional technique. However, the technique of present embodiment makes it possible to produce the high-frequency switch module having a size of 6.7 mm×5.5 mm=36.85 mm². Approximately, the mount area can be reduced by seven percent. In accordance with the present embodiment, it is not necessary to make the high-frequency switch module 10 having an extremely multilayered structure. As shown in FIG. 9, the high-frequency switch module 10 having a thickness of 1.8 mm in the conventional technique (shown in FIG. 1) can significantly be reduced to 1.5 mm in accordance with the present embodiment. Compared with the conventional high-frequency switch module in volume rate, the high-frequency switch module 10 in accordance with the present embodiment can be reduced to approximately 78 percent. FIG. 9 shows a top view and a side view illustrating dimensions of the high-frequency switch module 10 in accordance with the present embodiment. For comparison, the dimensions of the high-frequency switch module 900 (shown in FIG. 1) are also shown in dotted lines.

Further, by employing GaAs switch 11A, the high-frequency switch module having a low insertion loss is obtainable without degrading the characteristics, as compared to the PIN diode switch circuit.

In the above-mentioned circuitry, the GaAs switch 11A, the LPFs 4a and 4b, the BPFs 5a, 5b, and 5c, and the ESD protection circuit 18 are mounted on a single circuit board, and are produced as a single package. A ceramic substrate such as LTCC (Low Temperature Co-fired Ceramics) can be employed for the above-mentioned circuit board.

Figure 10:
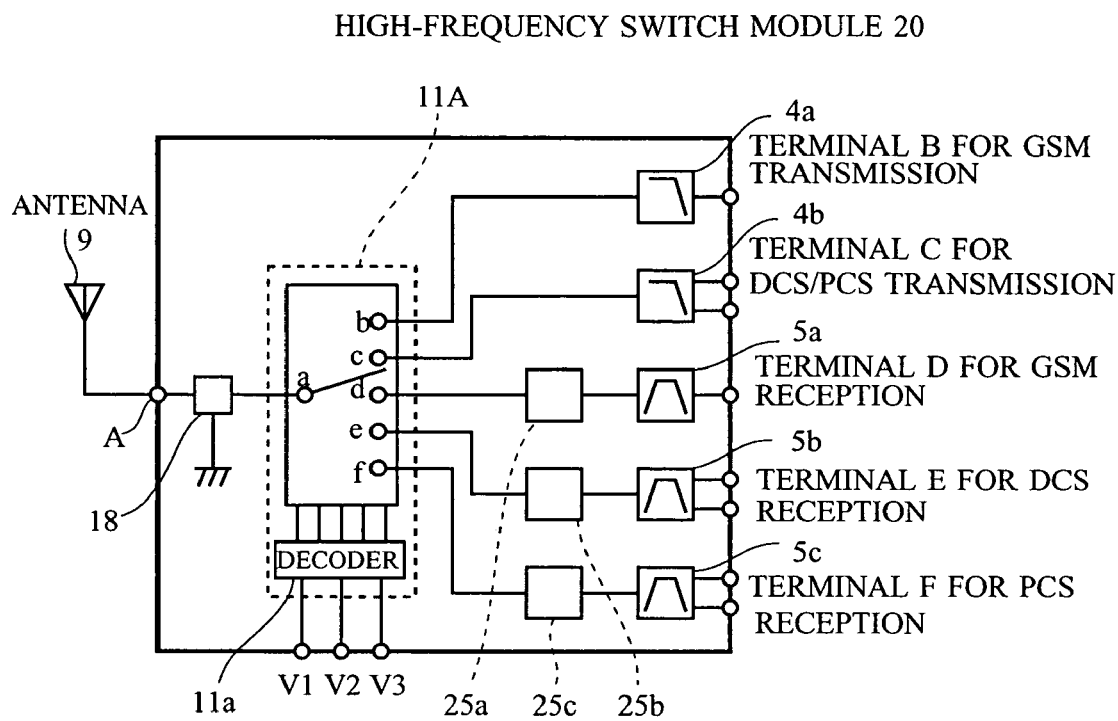
FIG. 10 shows a circuit diagram of a high-frequency switch module 20 in accordance with a second embodiment of the present invention.

A description will now be given of a second embodiment with reference to FIG. 10. FIG. 10 shows a circuit diagram of a high-frequency switch module 20 in accordance with the present embodiment. Hereinafter, in the second embodiment, the same components and configurations as those of the first embodiment have the same reference numerals and a detailed explanation will be omitted, if not otherwise specified.

Referring to FIG. 10, the high-frequency switch module 20 having the same circuit structure as the first embodiment, includes the GaAs switch 11A, BPFs 5a, 5b, and 5c, and impedance regulator circuits 25a, 25b, and 25c. The impedance regulator circuits 25a, 25b, and 25c are respectively introduced between the GaAs switch 11A and the BPFs 5a, 5b, and 5c.

Figure 11:
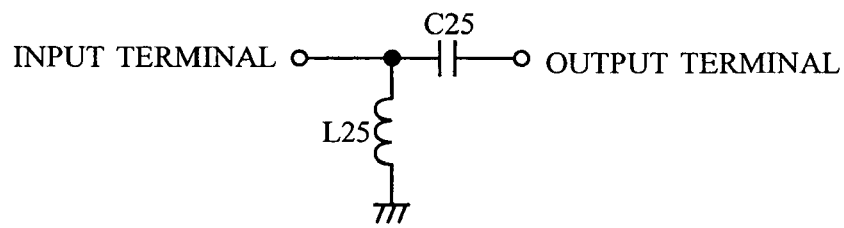
FIG. 11 shows a circuit structure of impedance regulator circuits 25a, 25b, and 25c in accordance with the second embodiment of the present invention.

FIG. 11 shows a circuit structure of the impedance regulator circuits 25a, 25b, and 25c. As shown in FIG. 11, a capacitor C25 is connected between the input and output terminals. A line that connects the input terminal and the capacitor C25 is branched and is grounded via an inductor L25.

In the impedance regulator circuits 25a, 25b, and 25c, the impedance can be controlled by trimming the inductor L25 and the capacitor C25 to adjust the values thereof.

Figure 12A:
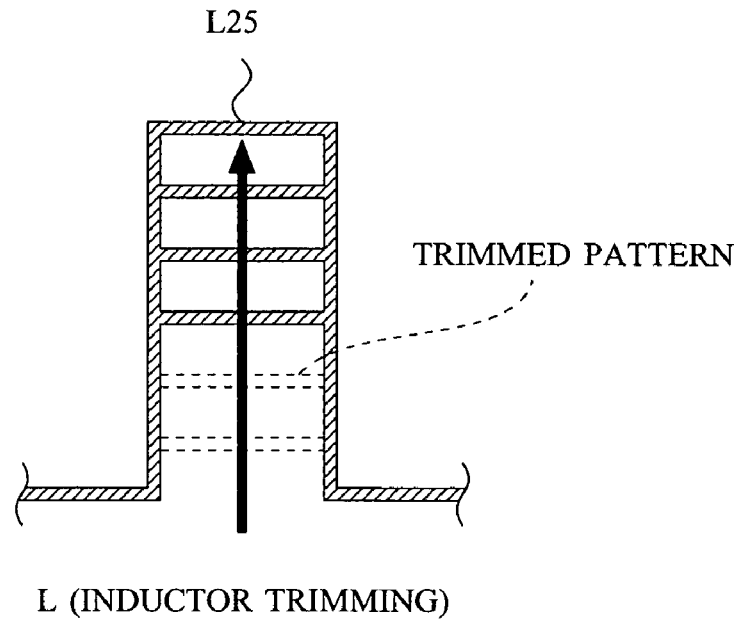
FIG. 12A shows procedure for trimming an inductor L25.
Figure 12B:
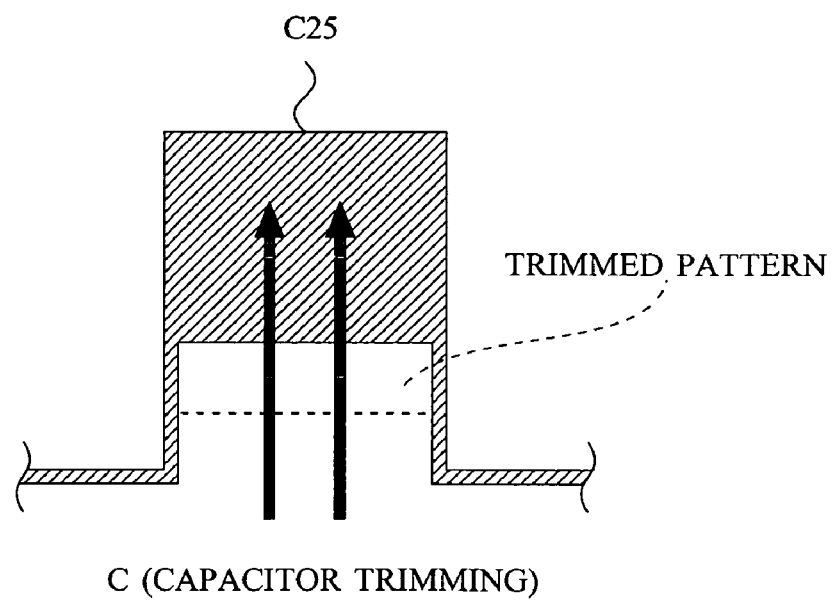
FIG. 12B shows procedure for trimming a capacitor C25.

FIG. 12A shows a procedure for trimming the inductor L25. The line pattern that forms the inductor L25 is trimmed sequentially so as to obtain a desired inductance. Referring to FIG. 12B, the line pattern that forms an electrode of the capacitor C25 is trimmed sequentially so as to obtain a desired capacitance.

By the above-mentioned trimming and adjusting the inductance of the inductor L25 and the capacitance of the capacitor C25, it is possible to control the impedance between the GaAs switch 11A and the BPFs 5a, 5b, and 5c. That is, the inductor L25 and the capacitor C25 are respectively selected for trimming so that the input impedance of the BPF 5b is infinite in the frequency ranges of the PCS reception system. The inductor L25 and the capacitor C25 in the impedance regulator circuit 25b are connected to the BPF 5b for DCS reception system. Similarly, the inductor L25 and the capacitor C25 are respectively selected for trimming so that the input impedance of the BPF 5c is infinite in the frequency ranges of the DCS reception system. The inductor L25 and the capacitor C25 in the impedance regulator circuit 25c are connected to the BPF 5c for PCS reception system. This makes possible to reduce variations in the insertion loss of the BPF and to reduce the variations of the product characteristics.

Figure 13:
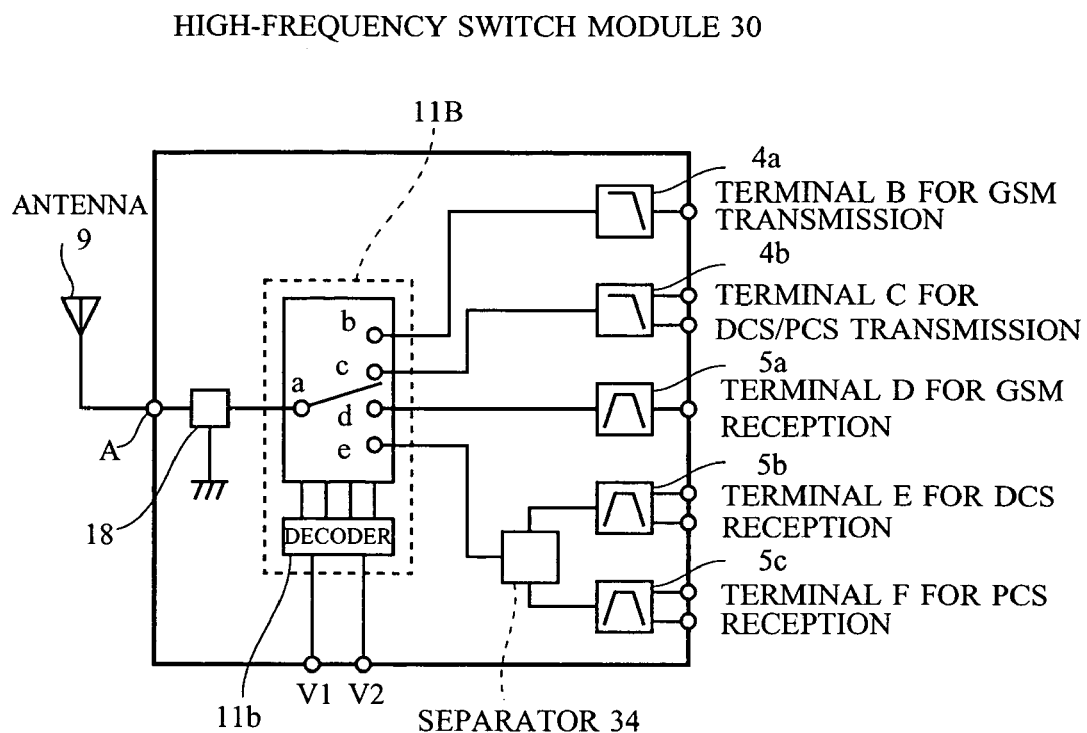
FIG. 13 shows a circuit structure of a high-frequency switch module 30 in accordance with a third embodiment of the present invention.

A description will now be given of a third embodiment. FIG. 13 shows a circuit diagram of a high-frequency switch module 30. Hereinafter, in the third embodiment, the same components and configurations as those of the first and second embodiments have the same reference numerals and a detailed explanation will be omitted, if not otherwise specified.

Referring to FIG. 13, the circuit diagram of a high-frequency switch module 30 has the same configuration as that of a high-frequency switch module 10 in accordance with the first embodiment; however, the GaAs switch 11A is replaced by a GaAs switch 11B. The GaAs switch 11B has one terminal less than the GaAs switch 11A, regarding the terminal to which the terminal a is connected. The BPFs 5b and 5c share part of the line connected to the terminal e. A separator/combiner 34 is introduced between the terminal e and the BPFs 5b and 5c so as to selectively use the BPFs 5b and 5c.

More specifically, in the GaAs switch 11B, the number of the terminals to be selected by the terminal a is smaller than that of the LPFs 4a and 4b, and the BPFs 5a, 5b, and 5c. That is, the number of the terminals to be selected by the terminal a is smaller than that of frequency ranges to be selected. As shown in FIG. 13, there are five terminals, namely, the LPFs 4a and 4b, and the BPFs 5a, 5b, and 5c; however, there are four terminals to which the terminal a is connected.

Figure 14:
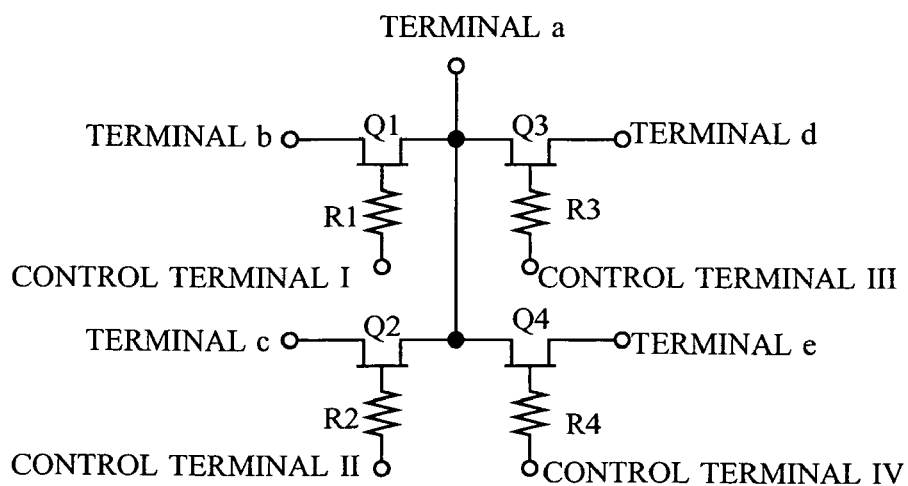
FIG. 14 shows a circuit structure of a GaAs switch 11B in accordance with the third embodiment of the present invention.

Referring to FIG. 14, the above-mentioned GaAs switch 11B includes four FETs Q1 through Q4, and the resistors R1 through R4 are respectively connected to gate electrodes of the four FETs Q1 through Q4. In other words, as compared to the circuitry of the GaAs switch 11A in accordance with the first embodiment (shown in FIG. 3), one FET and one resistor are not included, namely, Q5 and R5. This results in a reduction of the mount area.

In the case where the number of the terminals to which the terminal a is connected is smaller than that of the number of frequency ranges, the BPF 5b and 5c, for example, share one of the terminals b through f (the terminal e in FIG. 13). A combination of the BPFs 5b and 5c may be replaced by another combination of the BPFs 5a and 5b or the BPFs 5a and 5c. It is preferable to employ the BPFs 5b and 5c, considering the frequency ranges of the respective communication systems.

The separator/combiner 34 is introduced on the line connected to a shared terminal e so as to separate the high-frequency propagation signals into two lines. In other words, by employing the separator/combiner 34 to separate the high-frequency signals, and the two BPFs 5b and 5c are connected to the same terminal e in the GaAs switch 11B, a more downsized GaAs switch is obtainable, and accordingly, a more downsized product is obtainable. With the above-mentioned configuration, the high-frequency switch module 30 is able to operate in the same manner as the first embodiment, and in addition, does not adversely affect the characteristics.

There are two control terminals in a decoder 11b of the GaAs switch 11B, since there are four selected terminals in accordance with the present embodiment. Consequently, 2-bit switching voltage is applied to the decoder 11b. Table 2 shows the voltage levels of V1 and V2 in the decoder 11b, those of the control terminals I through IV and the corresponding decodes, namely, an example of a switching logic of transmission and reception.

TABLE 2

|  | V1 | V2 |
| --- | --- | --- |
| GSM transmission (terminal b) | Low | Low |
| DCS/PCS transmission (Terminal c) | High | Low |
| GSM reception (terminal d) | Low | High |
| DCS/PCS reception (terminal e) | High | High |

Referring to Table 2, the terminal a can be connected to one of the terminals b through e by respectively turning ON and OFF the FETs Q1 through Q4 according to the logic in Table 2. That is, it is possible to control the GaAs switch 11B with a small number of bits as compared to the first embodiment. This enables to simplify the product.

As described above, in accordance with the present embodiment, one or more selected terminals can be omitted in the GaAs switch 11B by introducing the separator/combiner 34 between the GaAs switch 11B and the BPFs. This enables to downsize the GaAs switch and simplify the circuit structure of the control systems. Accordingly, it is possible to downsize the circuitry and the whole high-frequency switch module.

Figure 15:
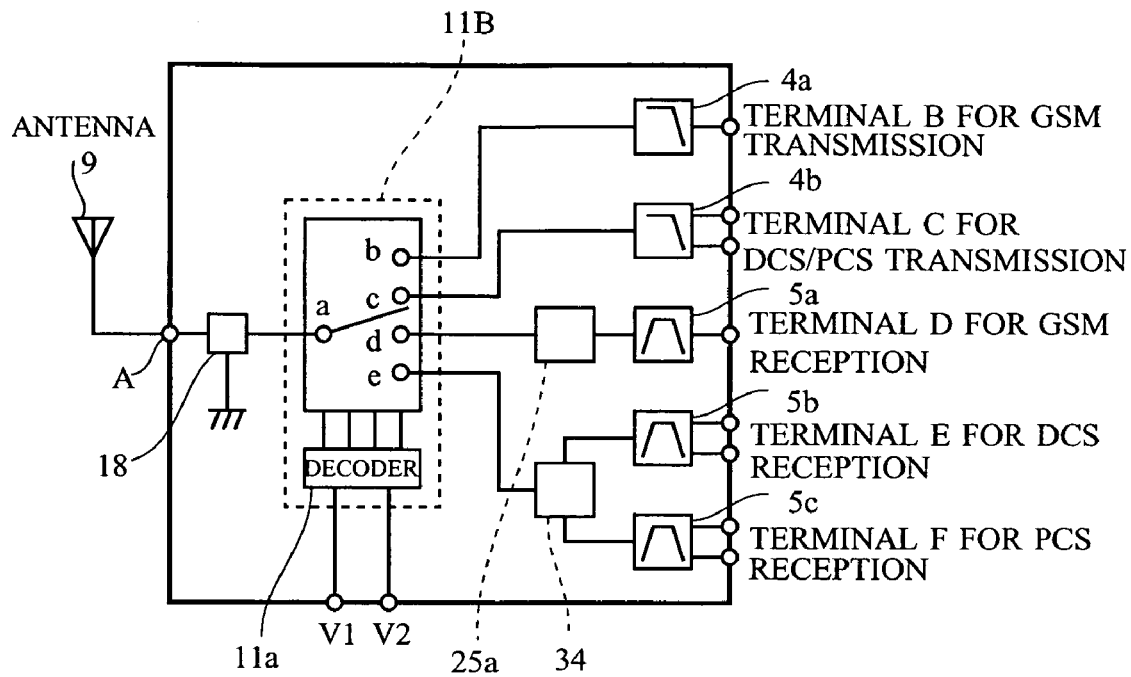
FIG. 15 shows a high-frequency switch module 40 in accordance with a fourth embodiment of the present invention.

A description will now be given of a fourth embodiment. FIG. 15 shows a circuit diagram of a high-frequency switch module 40. Hereinafter, in the fourth embodiment, the same components and configurations as those of the first through third embodiments have the same reference numerals and a detailed explanation will be omitted, if not otherwise specified.

As shown in FIG. 15, the high-frequency switch module 40 in accordance with the present embodiment has the same circuit structure as that of the third embodiment. The high-frequency switch module 40 further includes an impedance regulator circuit 25a as in the second embodiment on the line that connects a BPF 5a and a GaAs switch 11B. The high-frequency switch module 40 does not include a separator/combiner 34 between the BPF 5a and the GaAs switch 11B.

With the above-mentioned circuit structure, in accordance with the present embodiment, it is able to reduce one or more selected terminals in the GaAs switch 11B. Accordingly, it is possible to downsize the circuitry and the whole high-frequency switch module. In addition to thus obtained effects, it is also possible to adjust the impedance between the GaAs switch and the BPF and reduce variations in the insertion loss of the BPF. This results in a reduction in the variations of the product characteristics.

A description will now be given of a fifth embodiment. In the present embodiment, another example of the structure of impedance regulator circuits 25a, 25b, and 25c. Hereinafter, in the fifth embodiment, the same components and configurations as those of the first through fourth embodiments have the same reference numerals and a detailed explanation will be omitted, if not otherwise specified.

Figure 16:
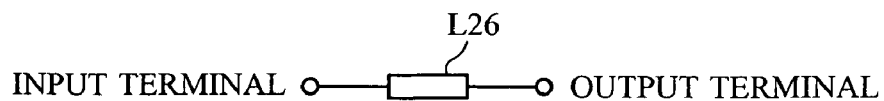
FIG. 16 shows another example of a circuit structure of impedance regulator circuits 25a, 25b, and 25c.

FIG. 16 shows another example of the structure of impedance regulator circuits 25a, 25b, and 25c. As shown in FIG. 16, the impedance regulator circuits 25a, 25b, and 25c respectively include a transmission line L26.

It is preferable to select the transmission line L26 so that an input impedance of a BPF 5b is infinite in the frequency range of the PCS reception system. The transmission line L26 of the impedance regulator circuit 25b is connected to the BPF 5b of the DCS reception system. It is also preferable to select the transmission line L26 so that the input impedance of a BPF 5c is infinite in the frequency range of the PCS reception system. The transmission line L26 of the impedance regulator circuit 25c is connected to the BPF 5c of the PCS reception system. Thus, it is possible to adjust the impedance between the GaAs switch 11B and the BPF. That is, it is possible to reduce variations in insertion loss of the BPF. This results in a reduction in the variations of the product characteristics.

The inductance of the transmission line L26 can be adjusted with the use of trimming as shown in FIG. 12. This makes it possible to adjust the inductance according to the product and improve the quality of the product.

In addition, in accordance with the present embodiment, the impedance regulator circuits 25a, 25b, and 25c respectively are formed with transmission lines L26. This makes it possible to reduce the mount area on a circuit board, as compared to the impedance regulator circuit having an inductor and capacitor (shown in FIG. 11). Therefore, it is possible to downsize the whole product.

A description will now be given of a sixth embodiment. The GaAs switch 11B does not include the separator/combiner 34 in the sixth embodiment, as compared to the embodiments described above. Two BPFs share a terminal (e in accordance with the third embodiment). Hereinafter, in the sixth embodiment, the same components and configurations as those of the first through fifth embodiments have the same reference numerals and a detailed explanation will be omitted, if not otherwise specified.

Figure 17:
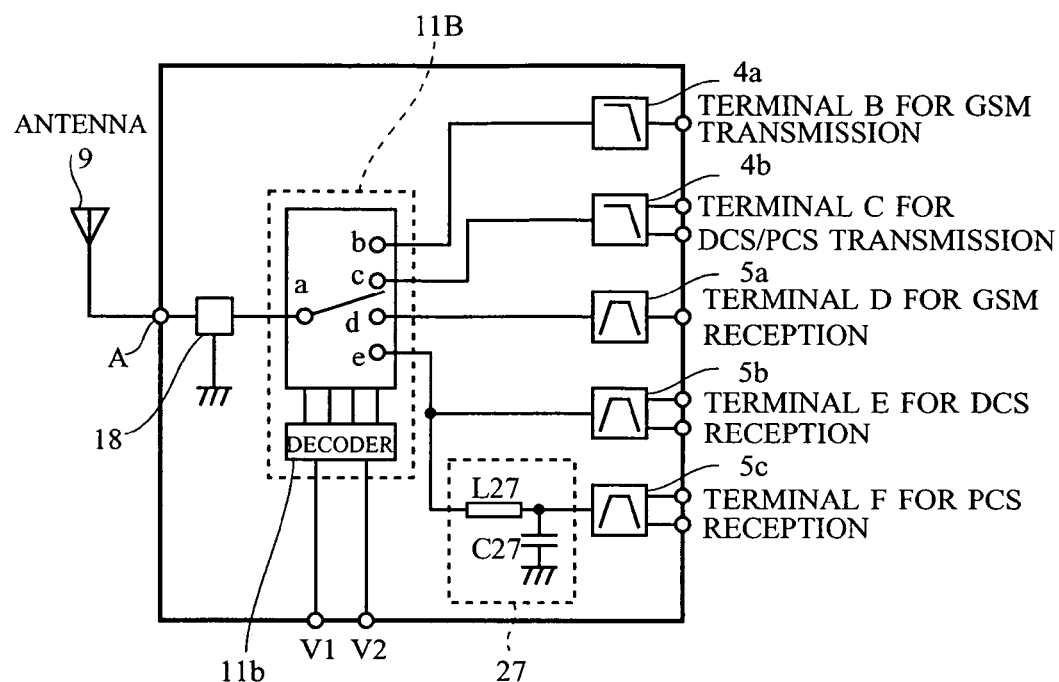
FIG. 17 shows a high-frequency switch module 60 in accordance with a sixth embodiment of the present invention.

FIG. 17 shows a high-frequency switch module 60 in accordance with the sixth embodiment. Referring to FIG. 17, the high-frequency switch module 60 has the same circuit structure as that of the first embodiment. However, the GaAs switch 11A is replaced by the GaAs switch 11B. A line from a terminal e in the GaAs switch 11B is branched, and one is connected to the BPF 5b of the DCS reception system, and the other is connected to the BPF 5c of the PCS reception system via an impedance regulator circuit 27.

The impedance regulator circuit 27 includes a transmission line L27 on the line that connects the terminal e and the BPF 5c. As described, the line from the terminal e is branched and is connected to the transmission line L27. Another line that connects the transmission line L27 and the BPF 5c is branched, and is grounded via a capacitor C27.

With the above-mentioned circuit structure, the transmission line L27 and the capacitor C27 are respectively selected so that the input impedance of the BPF 5c is infinite in the frequency range of the DCS reception system. This prevents crosstalk of high-frequency signals between two communication systems sharing the terminal e. In addition, it is not necessary to employ the separator/combiner 34 for separating the high-frequency signals or the impedance regulator circuits 25a, 25b, and 25c respectively connected to the BPFs. Therefore, it is possible to downsize the circuit and produce a more small-sized product. Further, it is possible to employ a small-sized GaAs switch and reduce the mount area. This makes it possible to a further downsized product.

The present invention is not limited to the specifically disclosed embodiments, and other embodiments, variations and modifications may be made without departing from the scope of the present invention.

The present invention is based on Japanese Patent Application No. 2003-354151 filed on Oct. 14, 2003, the entire disclosure of which is hereby incorporated by reference.

What is claimed is:

1. A high-frequency switch module comprising:
   transmission lines respectively equipped with low pass filters; and
   a gallium arsenide switch that selects one of the low pass filters,
   wherein:
   a low pass filter is composed of a parallel circuit including a first inductor and a capacitor connected in parallel, a second inductor connected to an input terminal of the low pass filter at one end of the parallel circuit, and a third inductor connected to an output terminal of the low pass filter at another end of the parallel circuit, and
   the second and third inductors having inductances greater than that of the first inductor.

2. The high-frequency switch module as claimed in claim 1, further comprising reception systems respectively equipped with bandpass filters,
   wherein the gallium arsenide switch selects one of the low pass filters and the band pass filters.

3. The high-frequency switch module as claimed in claim 2, further comprising impedance regulator circuits provided on lines that connect the bandpass filters and the gallium arsenide switch.

4. The high-frequency switch module as claimed in claim 3, wherein:
   the impedance regulator circuit is composed of an inductor, a capacitor, or a transmission line; and
   at least one of the inductor, the capacitor, and the transmission line comprises a conductive pattern having an inductance or a capacitance adjustable by trimming.

5. The high-frequency switch module as claimed in claim 2, wherein:
   the high-frequency switch module has three reception systems; and
   at least two of the three reception systems are respectively equipped with the bandpass filters.

6. The high-frequency switch module as claimed in claim 1, further comprising a separator that separates high-frequency signals from the gallium arsenide switch,
   wherein at least two of the bandpass filters are connected to a single terminal of the gallium arsenide switch via the separator.

7. The high-frequency switch module as claimed in claim 6, further comprising an impedance regulator circuit provided on a line that connects the gallium arsenide switch and at least one of the band pass filters that is not connected to the separator.

8. The high-frequency switch module as claimed in claim 1, further comprising reception systems respectively equipped with bandpass filters,
   wherein:
   at least two of lines that connect the bandpass filters and the gallium arsenide switch are joined and are connected to a single terminal of the gallium arsenide switch; and
   an impedance regulator circuit is provided on at least one of said at least two of lines.

9. The high-frequency switch module as claimed in claim 1, wherein the gallium arsenide switch comprises:
   a plurality of transistors; and
   a decoder that decodes a switching signal inputted from outside into control voltages that turn on and off the transistors.

10. The high-frequency switch module as claimed in claim 1, further comprising a protection circuit that protects the gallium arsenide switch against static electricity applied through an antenna.

11. The high-frequency switch module as claimed in claim 10, wherein the protection circuit is a high pass filter.

12. The high-frequency switch module as claimed in claim 1 wherein:
   the high-frequency switch module has two transmission systems; and
   the two transmission systems are respectively equipped with the low pass filters.

13. The high-frequency switch module as claimed in claim 1, wherein the low pass filter and the gallium arsenide switch are mounted into a single package.

* * * * *